United States Patent Office.

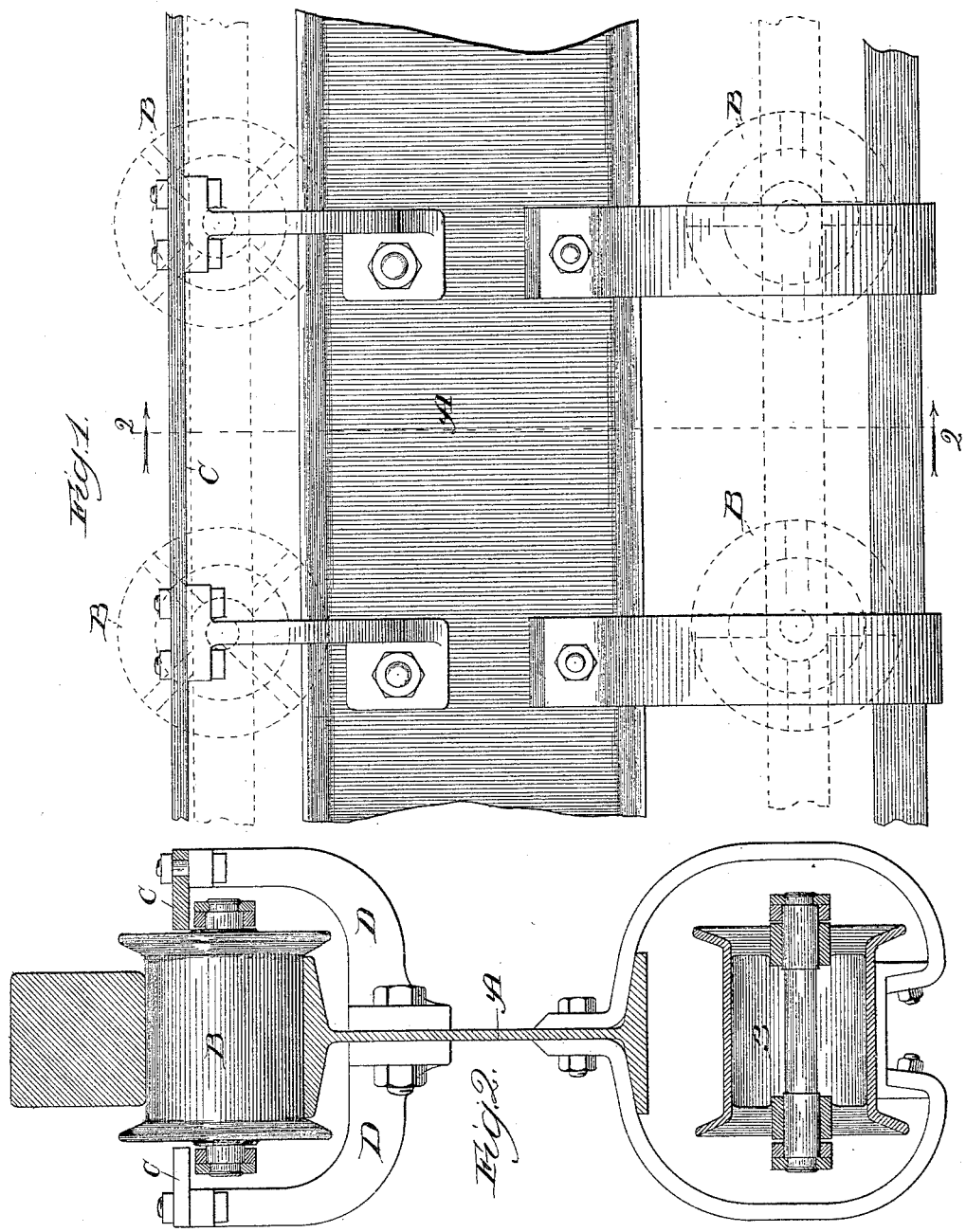

CHARLES PETTIGREW, OF JOLIET, ASSIGNOR TO THE ILLINOIS STEEL COMPANY, OF CHICAGO, ILLINOIS.

BILLET-CONVEYER.

SPECIFICATION forming part of Letters Patent No. 445,286, dated January 27, 1891.

Application filed August 16, 1890. Serial No. 362,167. (No model.)

*To all whom it may concern:*

Be it known that I, CHARLES PETTIGREW, of Joliet, Will county, Illinois, have invented a new and useful Improvement in Billet-Conveyers, of which the following is a specification.

The object of my invention, which is an improvement on the one described in the Smith, Treat, and Pettigrew application, filed July 18, 1890, Serial No. 359,152, is to provide guides for billet-conveyers having flanged rollers; and the invention consists in the features and combinations hereinafter described and claimed.

In the accompanying drawings, Figure 1 is a side elevation of parts of a billet-conveyer containing my improvements, and Fig. 2 a cross-section taken in line 2 of Fig. 1.

A is the conveyer; B, the flanged rollers thereof; C, guides for the rollers, and D brackets supporting the guides.

Where flanged rollers are used in billet-conveyers, the flanges are not always sufficient to insure their remaining on the track formed by the I-beams. They sometimes mount and run off the beam or track. To obviate this difficulty, I provide guides extending along the I-beam or track at each side of the rollers. These guides are preferably flat bars supported by brackets secured to the I-beam and extending upwardly therefrom. They are so arranged as to extend inwardly from the brackets to a point near the end of the rollers to prevent the rollers from working sidewise, and they are placed above the endless chain of the conveyer, so as not to interfere therewith, and so as to prevent the roller from lifting out.

Of course it will be understood that any suitable form of guide capable of holding the rollers on the track may be employed; but I prefer to construct and arrange the guides as above described.

I claim—

1. In combination with a billet-conveyer having flanged rollers, a guide at each side of the rollers to keep them on the track, substantially as described.

2. In combination with a billet-conveyer having flanged rollers, guides at each side of the rollers supported on brackets secured to the I-beam, substantially as described.

CHARLES PETTIGREW.

Witnesses:
S. J. DREW,
G. K. ROBERTS.